United States Patent [19]

Nishimoto

[11] Patent Number: 5,201,818
[45] Date of Patent: Apr. 13, 1993

[54] POWER STEERING APPARATUS

[75] Inventor: Mitsuhiko Nishimoto, Yoshino, Japan

[73] Assignee: Koyo Seiko Co., Ltd., Osaka, Japan

[21] Appl. No.: 686,107

[22] Filed: Apr. 16, 1991

[30] Foreign Application Priority Data

May 9, 1990 [JP] Japan .................................. 2-120343
May 9, 1990 [JP] Japan .................................. 2-120344

[51] Int. Cl.$^5$ ............................................ B62D 5/04
[52] U.S. Cl. ................................ 180/79.1; 364/424.05
[58] Field of Search .................... 180/79.1; 364/424.05

[56] References Cited

U.S. PATENT DOCUMENTS

| 4,800,975 | 1/1989 | Oshita et al. | 180/79.1 X |
| 5,027,276 | 6/1991 | Morishita et al. | 180/79.1 X |
| 5,050,697 | 9/1991 | Umemura | 180/79.1 X |
| 5,122,958 | 6/1992 | Eto et al. | 180/79.1 X |

FOREIGN PATENT DOCUMENTS

| 0350817 | 7/1989 | European Pat. Off. |
| 61-115771 | 6/1986 | Japan |
| 3301173 | 4/1989 | Japan |
| 6490870 | 4/1989 | Japan |
| 1-309876 | 12/1989 | Japan |
| 2-085061 | 6/1990 | Japan |
| 2-256652 | 10/1990 | Japan |
| 2188891 | 4/1987 | United Kingdom |

Primary Examiner—David H. Bollinger
Attorney, Agent, or Firm—Townsend and Townsend

[57] ABSTRACT

The power steering apparatus for assisting the return of a steering wheel by the rotating force of a motor for assisting steering force wherein noting the fact that the steering torque when the steering wheel is being returned is within the dead zone, whether the steering wheel is being returned is judged on the basis of the steering torque detected by a torque sensor and the terminal voltage of the motor, and the direction and magnitude of a driving current for the motor when the steering wheel is being returned are determined corresponding to the vehicle speed. Accordingly, the steering wheel is returned to the neutral position without using a steering angle sensor.

3 Claims, 12 Drawing Sheets

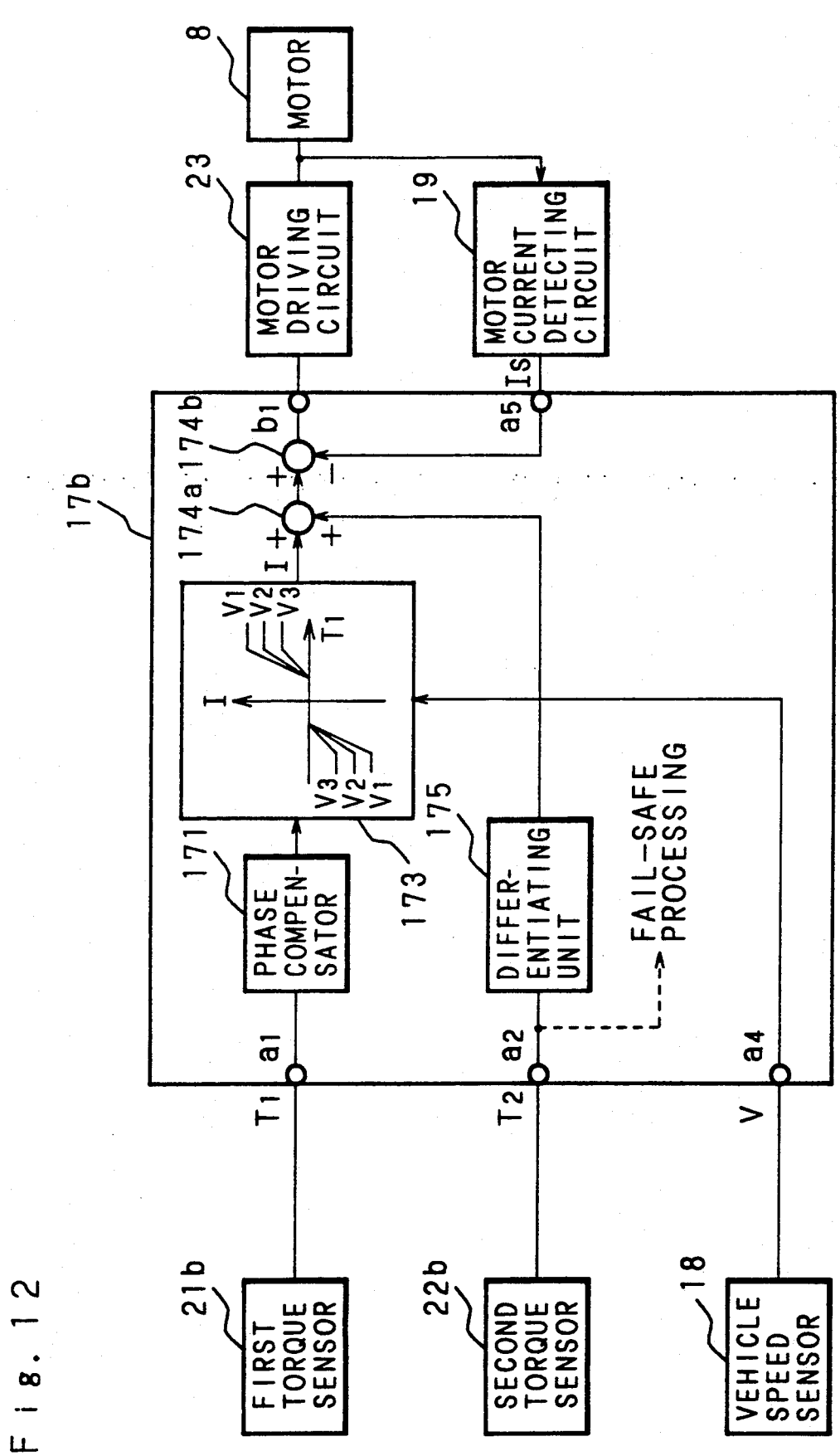

POWER STEERING APPARATUS

BACKGROUND OF THE INVENTION

1. Field of the Invention

The present invention relates to an electric power steering apparatus assisting steering force of a steering wheel with the rotating force of a motor.

2. Description of the Related Art

An electric power steering apparatus has been developed which provides a driver a comfortable steering feeling by driving a motor for assisting steering force on the basis of a detected result of a steering torque exerted on a steering wheel and by assisting force required for steering a vehicle with turning force of the motor.

Such conventional electric power steering apparatus has a problem that when the steering wheel is returning to the neutral position upon receipt of an input from a tire, the returning movement is hindered by a moment of inertia of a rotor of a motor and frictional resistance of a reduction gear coupled to an output shaft of the motor. Therefore, a detector for detecting a steering angle, e.g., a rotary sensor or stroke sensor, etc. is installed on a rack shaft, steering shaft or motor to overcome the problem by driving the motor with a current corresponding to the detected steering angle, and the steering wheel is returned to the neutral position by the torque of the motor.

According to the above-mentioned arrangement, however, the installation of the steering angle detector makes the power steering apparatus expensive.

Moreover, a power steering apparatus to solve such problems as the poor response due to the inertia of the motor, friction of the reduction gear disposed between the motor and the steering mechanism, and phase delay in an electric circuit by differentiating a detected signal of a torque sensor thereby to adjust the driving current of the motor is disclosed in Japanese Patent Application Laid-Open No. 61-115771 (115771-1986).

More specifically, in the above disclosure, by differentiating the detected signal of the torque sensor and adding it to a temporary control value obtained corresponding to the detected signal of the torque sensor, the steering mechanism is driven in correspondence to the steering torque detected by the torque sensor without a time delay.

According to the conventional apparatus, the relation between the torque and the temporary control value of the driving current of the motor is preliminarily set as a function. The temporary control value of the driving current for the motor is set from the detected signal of the torque sensor by use of the function, and the differentiated signal of the detected signal is added to the temporary control value to determine the final control value of the driving current. The driving current for the motor is controlled by the determined control value thereby to assist steering force. The detected signal to be differentiated is the same as the detected signal for determining the temporary control value of the driving current. A voltage of the detected signal for determining the temporary control value is corresponding to the detected value of the steering torque.

FIG. 3 is a graph showing an example of the relation between the steering torque and signal voltage, in which the vertical axis represents the signal voltage and the horizontal axis represents the steering torque. When the detected steering torque is out of the range necessary to assist steering force under the normal cruising condition, the responsive voltage is saturated. In other words, the range necessary to assist steering force under the normal cruising condition is an effective detection width of the steering torque. Since the signal to be differentiated is the same signal as the detected signal for determining the temporary control value of the driving current, the differentiating is significant within the range of the effective detection width.

As is mentioned above, in the conventional apparatus, the detected signal of the steering torque to be differentiated is the same as the detected signal to determine the temporary control value of the driving current, and the voltage signal corresponding to the steering torque is saturated when the steering torque is out of the effective detection width. Therefore, the differential value becomes always 0 even if the steering torque is out of the effective detection width, the differentiating is not effective and the responding efficiency of the steering mechanism worsens.

SUMMARY OF THE INVENTION

The present invention has been devised to solve the aforementioned problems.

A first object of the present invention is to provide a inexpensive power steering apparatus capable of controlling a motor for assisting steering force without using a steering angle detector when a steering wheel is being returned.

A second object of the present invention is to provide a power steering apparatus capable of differentiating the steering torque in a wider range, to control the driving current of an assisting motor, thereby achieving good responding efficiency of a steering mechanism to the steering torque in the wider range.

The above and further objects and features of the invention will more fully be apparent from the following detailed description with accompanying drawings.

BRIEF DESCRIPTION OF THE DRAWINGS

FIG. 12 is a block diagram showing the structure of a third embodiment of a control system of the power steering apparatus of the present invention.

DESCRIPTION OF THE PREFERRED EMBODIMENTS

Figure 1:
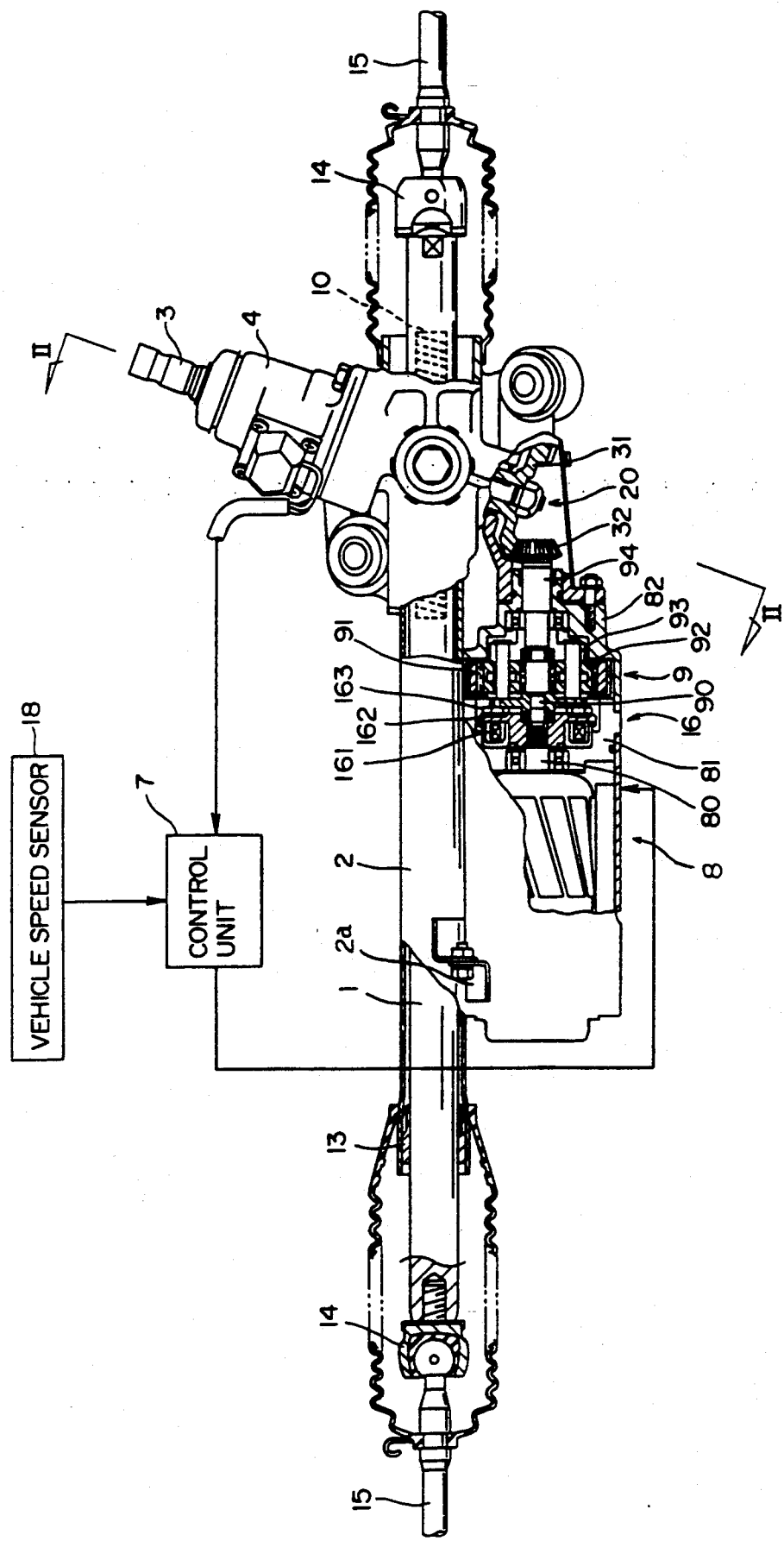
FIG. 1 is a partially broken sectional view showing the structure of a power steering apparatus according to the present invention.
Figure 2:
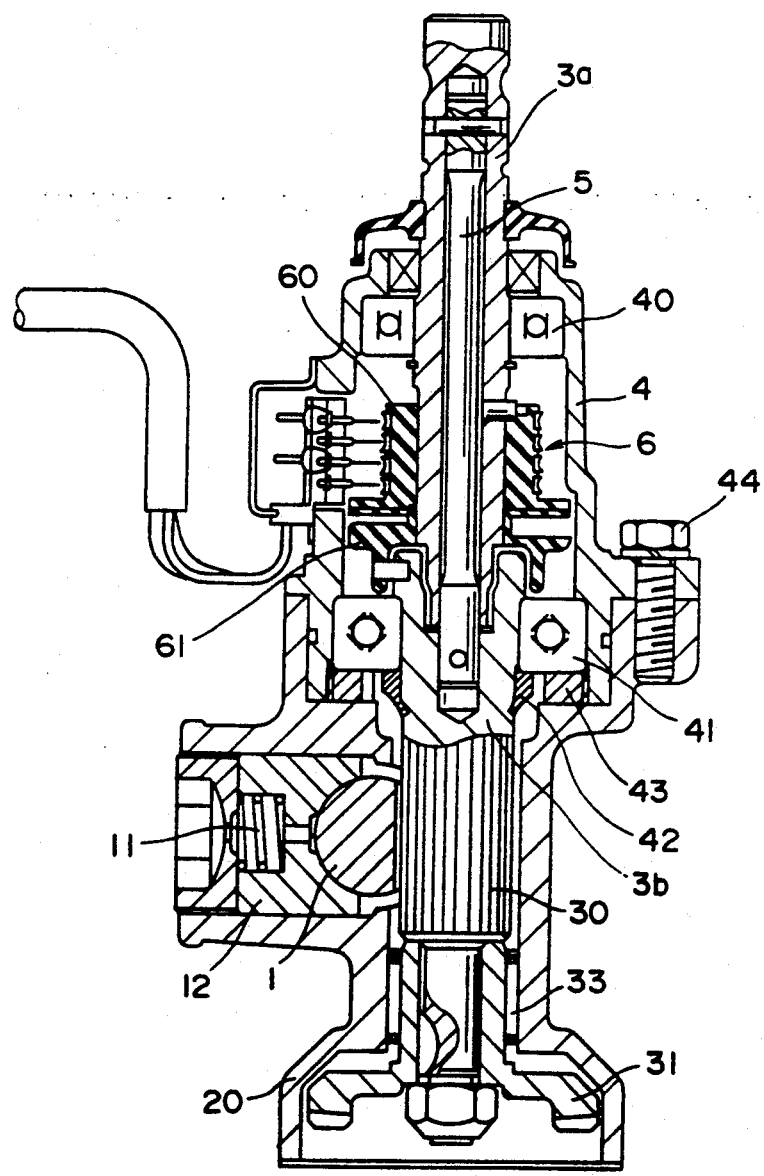
FIG. 2 is an enlarged sectional view taken along the line II—II of FIG. 1.
Figure 3:
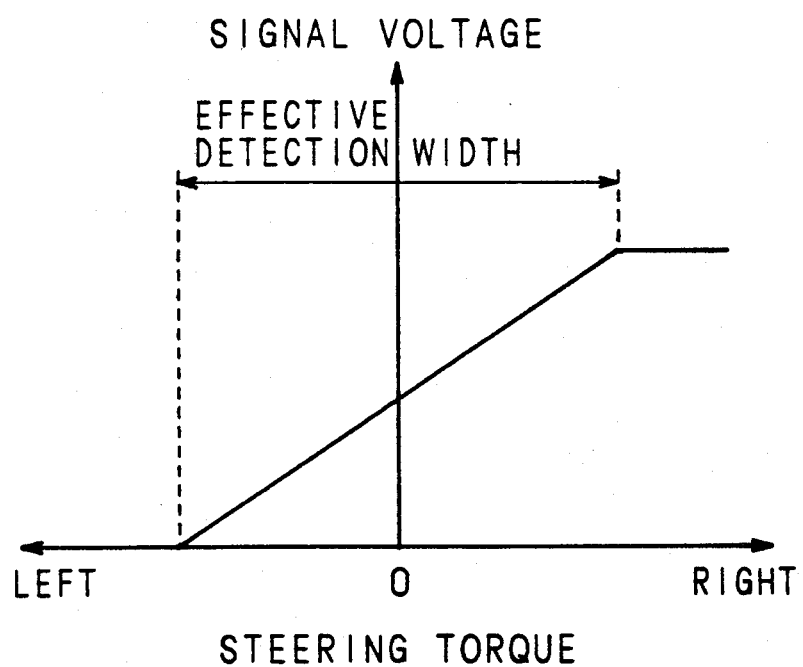
FIG. 3 is a graph of an example of the relation between the steering torque and a voltage of a signal for driving a motor.

The present invention will be described referring to drawings showing embodiments thereof. FIG. 1 is a partially broken sectional view of a power steering apparatus related to the invention. FIG. 2 is an enlarged sectional view along line II—II of FIG. 1.

In the figures, reference numeral 1 designates a rack shaft inserted concentrically within a cylindrical rack shaft case 2 fixed at a part of a vehicle body with its longitudinal direction as right-left direction. Numeral 3 is a pinion shaft supported rotatably in the state that the shaft center thereof intersects obliquely against the rack shaft 1 at the inside of a pinion shaft case 4 connected following the vicinity of one end portion of the rack shaft 2.

The pinion shaft 3, as shown in FIG. 2, consists of an upper shaft 3a and a lower shaft 3b connected coaxially with each other through a torsion bar 5, the upper shaft 3a being supported inside of the pinion shaft case 4 by a ball bearing 40 with its upper end portion interlockingly combined to a steering wheel through a universal joint not shown. And the lower shaft 3b at the neighborhood position of the upper end portion is supported inside of the pinion shaft case 4 by a four-point contact ball bearing 41 in the state that the proper length of the under portion thereof is projected from a downside opening of the pinion shaft case 4. The four-point contact ball bearing 41 is fitted from outside to the lower shaft 3b from lower end portion side, and is positioned outside of the lower shaft 3b in the axial direction with both sides of the inner ring being held, by steps formed in the vicinity of the upper end portion of the lower shaft 3b and collar 42 fixed from outside from the lower end portion side and caulked to the peripheral surface. Then it is fitted into the pinion shaft case 4 together with the lower shaft 3b from aforementioned downside opening, and is positioned inside of the pinion shaft case 4 in the axial direction with both sides of the outer ring being held, by a circular shoulder part formed at the lower part of the case 4 and a lock nut 43 screwed to the case 4 from the opening, and loads radial load acting upon the lower shaft 3b and thrust load of both directions.

At the middle portion of the lower shaft 3b projected from the pinion shaft case 4, pinion teeth 30 in an appropriate length are formed in the axial direction thereof. In the case where the pinion shaft case 4 is fixed at the upper side of aforesaid rack shaft case 2 by fixing bolt 44, the pinion teeth 30 engages with rack teeth 10 formed at a position a little closer to one end portion of the rack shaft 1 in the axial direction thereof in an appropriate length inside of the rack shaft case 2, making the lower shaft 3b with rack shaft 1 engage, with their shaft centers intersect obliquely with each other. The lower shaft 3b is extended downward further from the position of engagement with the rack shaft 1, a big bevel gear 31 with the teeth-formed face thereof tilting downward being fittedly mounted coaxially with the lower shaft 3b at the lower end portion thereof. The lower shaft 3b is supported by needle roller bearing 33 in a bevel gear housing 20 connected following the downside of the rack shaft case 2 in the state of surrounding the big bevel gear 31. Accordingly, the lower shaft 3b is supported at both sides of the position of engagement of the rack teeth 10 with the pinion teeth 30 by the four-point contact ball bearing 41 and needle roller bearing 33, whereby flexing quantity of the lower shaft 3b at the position of engagement is kept within the tolerance.

Still more, at the position of engagement of the rack teeth 10 with the pinion teeth 30, a pressing piece 12 for pressing the rack shaft 1 by biasing force of a pressing spring 11 forward the pinion shaft 3 is provided so that the rack teeth 10 and the pinion teeth 30 can be engaged without any gap. The rack shaft 1 is, at the position of engagement, supported by the pressing piece 12 and the lower shaft 3b in the state that it is held from both sides of radial direction as well as it is supported by bearing bush 13 fitted into an end portion of the rack shaft case 2 opposite to the connected position of the pinion shaft case 4 with itself, it being movable freely in its axial direction inside of the rack shaft case 2. Both right and left end portions of the rack shaft 1 projected respectively at both sides of the rack shaft case 2 is connected to tie rods 15, 15 stretching respectively to the right and left wheels not shown through respective ball and socket joints 14, 14, the wheels being steered to right or left according to the movement of the rack shaft 1 in the axial direction thereof.

In FIG. 2, reference numeral 6 designates a torque sensor for detecting steering torque exerted on the steering wheel. The torque sensor 6 uses a potentiometer comprising a resistance holding member 60 which is outfitted to the upper shaft 3a, rotates therewith, and at the downside end surface, forms a circular resistance with the shaft center of the upper shaft 3a being the center, and a detecting piece holding member 61 which is outfitted to the lower shaft 3b, rotates therewith and, at the upside end surface, forms a detecting piece which slidely-contacts to a point in a radial direction on the resistance. The upper shaft 3a of the pinion shaft 3 rotates around the axial shaft according to the rotation of the steering wheel, however, road surface resistance acting upon the wheels acts upon the lower shaft 3b through the rack shaft 1, thereby, torsion corresponding to the steering torque exerted on the steering wheel is produced at torsion bar 5 interposed between the two shafts. A torque sensor 6 outputs relative displacement in the circumferential direction created between the upper shaft 3a and the lower shaft 3b accompanying the torsion of the torsion bar 5, as a potential corresponding to slidely contact position of the detecting piece with the resistance and in the case where the torsion is not created at the torsion bar 5, in other words, in the case where the steering operation is not performed, it is initialized so as to output the specified reference potential. The output signal of the torque sensor 6 is inputted in a control unit 7 which compares the signal with the reference potential to recognize the direction and size of the steering torque, then generates a driving signal to a motor 8 for assisting steering force provided in such a way as described later.

The motor 8 for assisting steering force is to transmit the turning force thereof to aforementioned lower shaft 3b through an electromagnetic clutch 16, epicycle reduction gear 9 and small bevel gear 32 which engages with the big bevel gear 31 and is smaller than the big bevel gear 31 in diameter.

The electromagnetic clutch 16 consists of a coil unit 161 which is annular in shape and fixed to a middle case 81 of the motor 8, a moving unit 162 which is outfitted at one side of a rotation axis 80 of the motor 8 coaxially therewith and rotates with the rotation axis 80, and engaging part 163 which is discoid in shape, faces the moving unit 162 and engages with the moving unit 162 by electromagnetic force caused by power supply to the coil unit 161, performing engaging and disengaging of turning force of the motor 8.

The epicycle reduction gear 9 consists of a sun shaft 90 which is fitted into the engaging part 163, rotates and has a sun gear supported at one end thereof by a bearing fitted into the moving unit 162, and supported at the other end by a bearing fitted into a planet carrier 93 to be described later, an outer ring 91 which is circular in shape and fixed to a casing end surface 82 of the motor 8 coaxially with the rotation axis 80, a plurality of planet gears 92, 92 ... which rotatably contacts with the inner surface of the outer ring 91 and with the outer surface of the sun gear of the sun shaft 90 respectively, autorotate around the shaft center respectively as well as revolve around the shaft center of the sun gear, and the planet carrier 93 which supports rotatably respective planet gears 92, 92 .... The epicycle reduction gear 9 has a smaller outer diameter than that of the motor 8 and is integrated with the motor 8 and electromagnetic clutch 16 at one side of the rotation axis 80.

An output shaft 94 of the epicycle reduction gear 9 is fitted into and fixed at a position of the shaft center of the planet carrier 93 which is positioned coaxially with the rotation axis 80 of the motor 8, and is projected in an appropriate length outside of the casing. At the tip portion of the output shaft 94, the small bevel gear 32 is fixedly mounted with its teeth-formed face turned toward the tip portion side, the small bevel gear 32 being constructed so as to rotate, together with the output shaft 94, corresponding to the revolution of the planet gears 92, 92 ....

The motor 8, electromagnetic clutch 16 and epicycle reduction gear 9 are fixed onto a blacket 2a provided outside of the rack shaft case 2, in the state that these shaft centers are approximately parallel to the shaft center of the rack shaft 1 and are fitted into the bevel gear housing 20 with the small bevel gear 32 being inside. And at the inside of the aforesaid housing 20, the small bevel gear 32 is engaged with the big bevel gear 31 fixedly mounted at the lower end portion of aforesaid lower shaft 3b. Backlash adjustment between the big bevel gear 31 and the small bevel gear 32, in fitting the epicycle reduction gear 9 into the bevel gear housing 20, can be performed easily by changing thickness and/or number of shims to be interposed at the abutting portion of the casing of the epicycle reduction gear 9 with the bevel gear housing 20.

To the control unit 7 is inputted an output signal from a vehicle speed sensor 18 besides the aforementioned output signal from the torque sensor, whereby a driving signal for driving the motor 8 is outputted in a manner as will be described later.

The operation of the control unit 7 will be depicted hereinafter.

Figure 4:
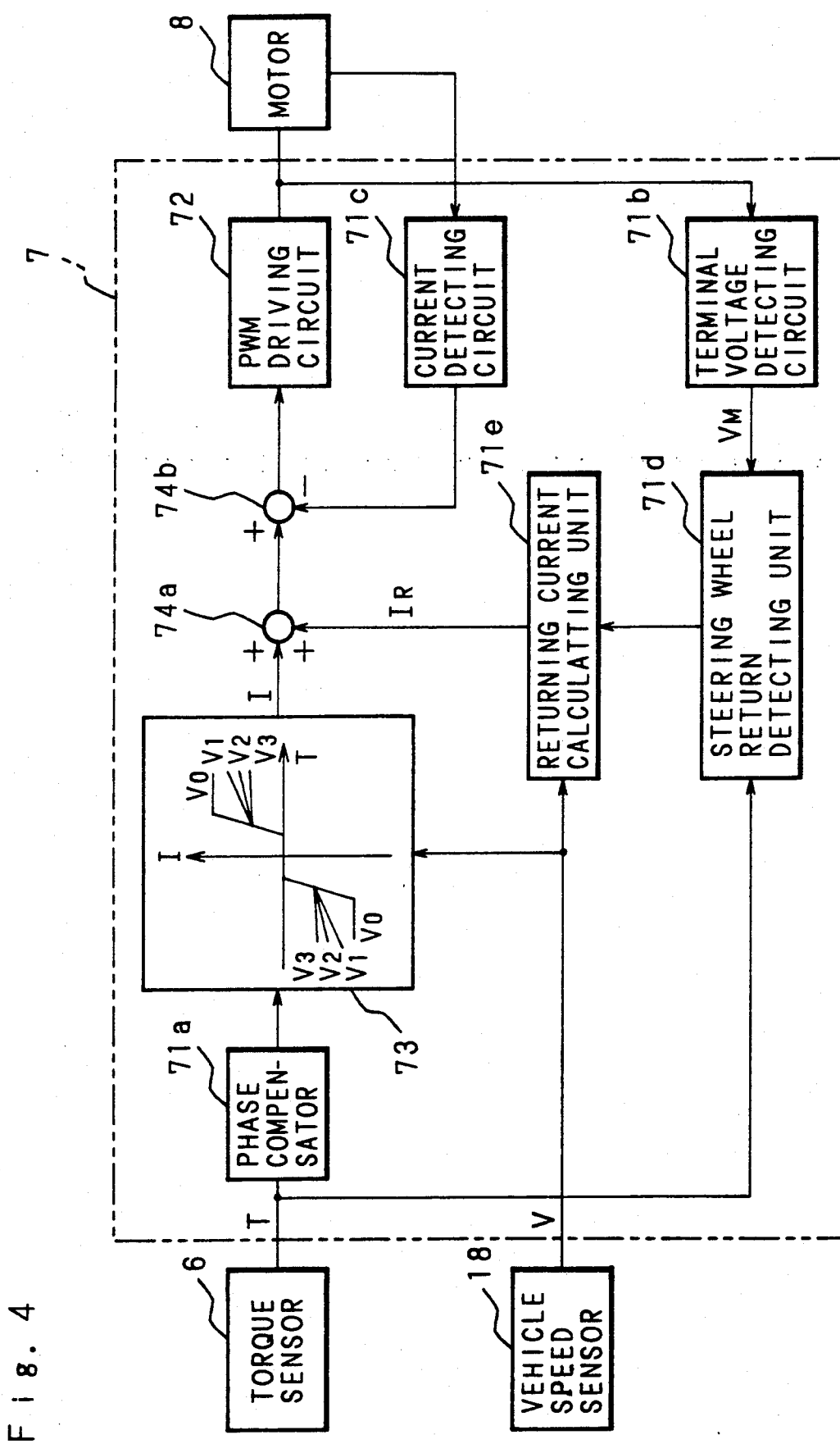
FIG. 4 is a block diagram showing the structure of a first embodiment of a control system to control the driving current of the motor in the power steering apparatus of the present invention.

FIG. 4 is a block diagram showing the structure of an embodiment of the control unit 7 of the power steering apparatus, which also illustrates the flow of the signals.

A torque signal (referred to as a torque T hereinafter) detected by the torque sensor 6 is respectively inputted to a phase compensator 71a for advancing the phase of a specified frequency band of the inputted signal to stabilize the system, and to a steering wheel return detecting unit 71d which detects the return of the steering wheel thereby to make the control unit 7 execute the control under the condition that the steering wheel is returned. The phase of the torque T is compensated by the phase compensator 71a, and inputted to an indicator current functional unit 73 which generates an indicator current I which is a control value of the current for driving the motor 8 when the steering wheel is turned but not returned.

A speed signal (referred to as a vehicle speed V hereinafter) detected by the vehicle speed sensor 18 is inputted to the indicator current function unit 73 and to a returning current calculating unit 71e which obtains a returning current $I_R$ which is a control value of the current for driving the motor 8 when the steering wheel is returned.

The terminal voltage of the motor 8 is detected by a terminal voltage detecting circuit 71b provided at the output side of a PWM (Pulse-Width Modulation) driving circuit 72 which will be described later. The driving current for the motor 8 is detected by a current detecting circuit 71c which, having a current detecting resistance (not shown) inserted in a motor line, detects the current flowing in the motor line. The result from the terminal voltage detecting circuit 71b is inputted to the steering wheel return detecting unit 71d, while the result detected by the current detecting circuit 71c is inputted to a subtracter 74b to be described later.

The indicator current function unit 73 generates the indicator current I based on the torque T and vehicle speed V. The indicator current I is inputted to an adder 74a.

Figure 5:
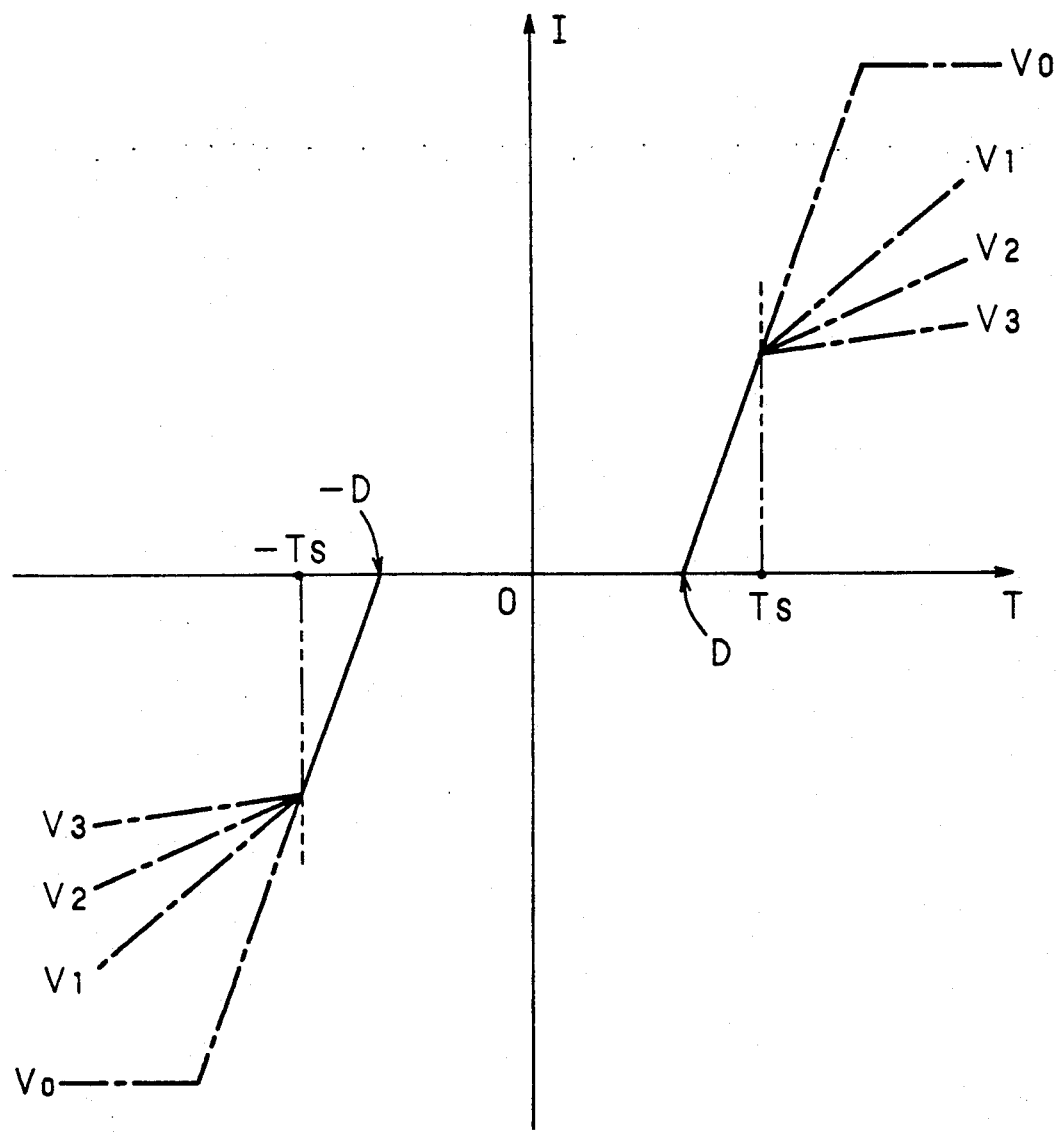
FIG. 5 is a graph showing the relation between an indicator current obtained in an indicator current function unit in the control system of the first embodiment and a steering torque.

FIG. 5 is a graph showing the relation between the indicator current I obtained by the indicator current function unit 73 and the torque T, wherein the vertical axis represents the indicator current I and the horizontal axis represents the torque T. It is to be noted here that the positive side of the horizontal axis shows the steering torque when the steering wheel is turned right, while the negative side thereof shows the steering torque when the steering wheel is turned left. Moreover, the positive side of the vertical axis shows the indicator current for the motor 8 to rotate the steering wheel right, and the negative side thereof shows the indicator current for the motor to rotate the steering wheel left. Further, the chain line in FIG. 5 depicts the relation between each vehicle speed $V_0$, $V_1$, $V_2$ or $V_3$ ($V_0 < V_1 < V_2 < V_3$, $V_0 = 0$) and the torque respectively determined.

The zone from $-D$ to $D$ in the graph is the dead zone. The indicator current I for the motor 8 increases in accordance with the increase of the torque T when the torque T goes out of the dead zone by turning the steering wheel right (or left), so that the assisting force increases. In this case, the indicator current I increases irrespective of the vehicle speed V until the steering torque T reaches a set value of the low torque $-T_s$ or $T_s$. Beyond the absolute set value, the relation between the torque T and indicator current I depends on the vehicle speed $V_0$, $V_1$, $V_2$, $V_3$, that is, the ratio of the indicator current I to the torque T becomes smaller as the vehicle speed increases. The vehicle speed $V_0$ shows the case of the stationary swing where the steering wheel is turned at a speed of 0 as the vehicle stops. Particularly in the case of the stationary swing, the indicator current I is arranged to be saturated when the torque T is over a predetermined value. The obtained indicator current I is inputted to the adder 74a.

The steering wheel return detecting unit 71d detects the returning of the steering wheel in a manner to be described later based on the torque T and terminal voltage $V_M$. In the case where the steering wheel is detected to be returned, the steering wheel return detecting unit 71d outputs a signal indicating the returning direction of the steering wheel to the returning current calculating unit 71e. The returning current calculating unit 71e calculating an absolute value of the returning current $I_R$ based on the vehicle speed V, and determining the polarity of the returning current $I_R$ based on the signal indicating the returning direction of the steering wheel inputted from the steering wheel return detecting unit 71d. The polarity of the returning current $I_R$ is the polarity for the motor 8 to rotate the steering wheel in the returning direction detected by the steering wheel return detecting unit 71d. The returning current $I_R$ is inputted to the adder 74a.

Figure 6:
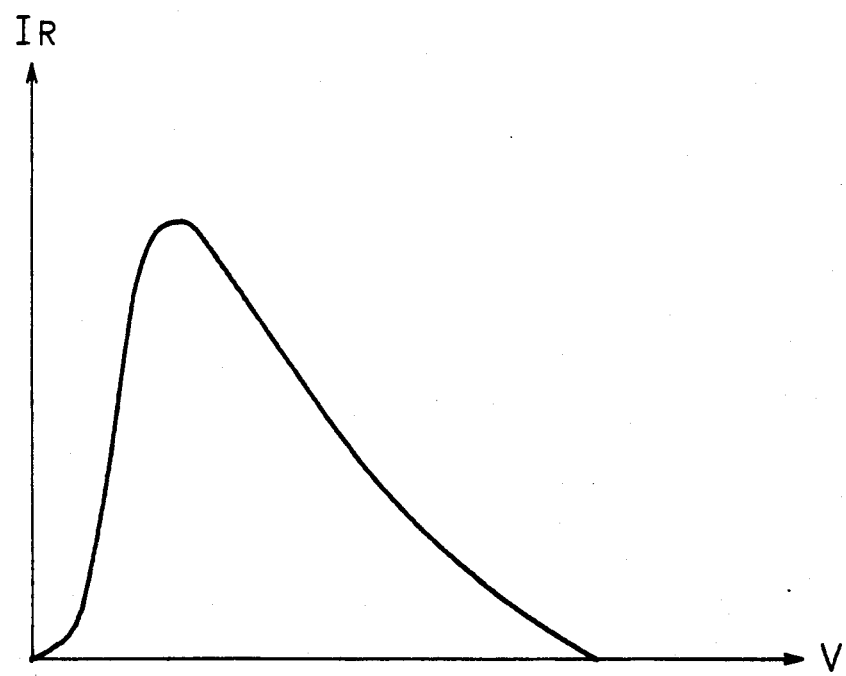
FIG. 6 is a graph showing the relation between a returning current obtained in a returning current calculating unit in the first embodiment and the vehicle speed.

The relation between the returning current $I_R$ and the vehicle speed V set at the returning current calculating unit 71e is shown in a graph of FIG. 6. As indicated in FIG. 6, the absolute value of the returning current $I_R$ is maximum when the vehicle speed V inputted to the returning current calculating unit 71e is a predetermined set value of the low speed, and decreases as the vehicle speed V becomes smaller or larger than the set value. The slope of a curve of the decreasing returning current $I_R$ is gentler at the side when the vehicle speed V becomes larger than at the side when the vehicle speed V becomes smaller. In other words, the returning current $I_R$ is so set as to increase the returning force for the steering wheel as the vehicle speed V is closer to the predetermined set value of the low speed.

The adder 74a adds the indicator current I inputted from the indicator current function unit 73 and the returning current $I_R$ inputted from the returning current calculating unit 71e, and inputs the added result to the subtracter 74b as a target current which is a control value of the driving current for the motor 8. The subtracter 74b subtracts a feed-back signal of the current detecting circuit 71c from this target current. The PWM driving circuit 72 drives the motor 8 on the basis of the subtracted result. Since the current detecting circuit 71c is arranged to detect the current including a flywheel current of the motor 8, the current loop is rendered stable.

Figure 7:
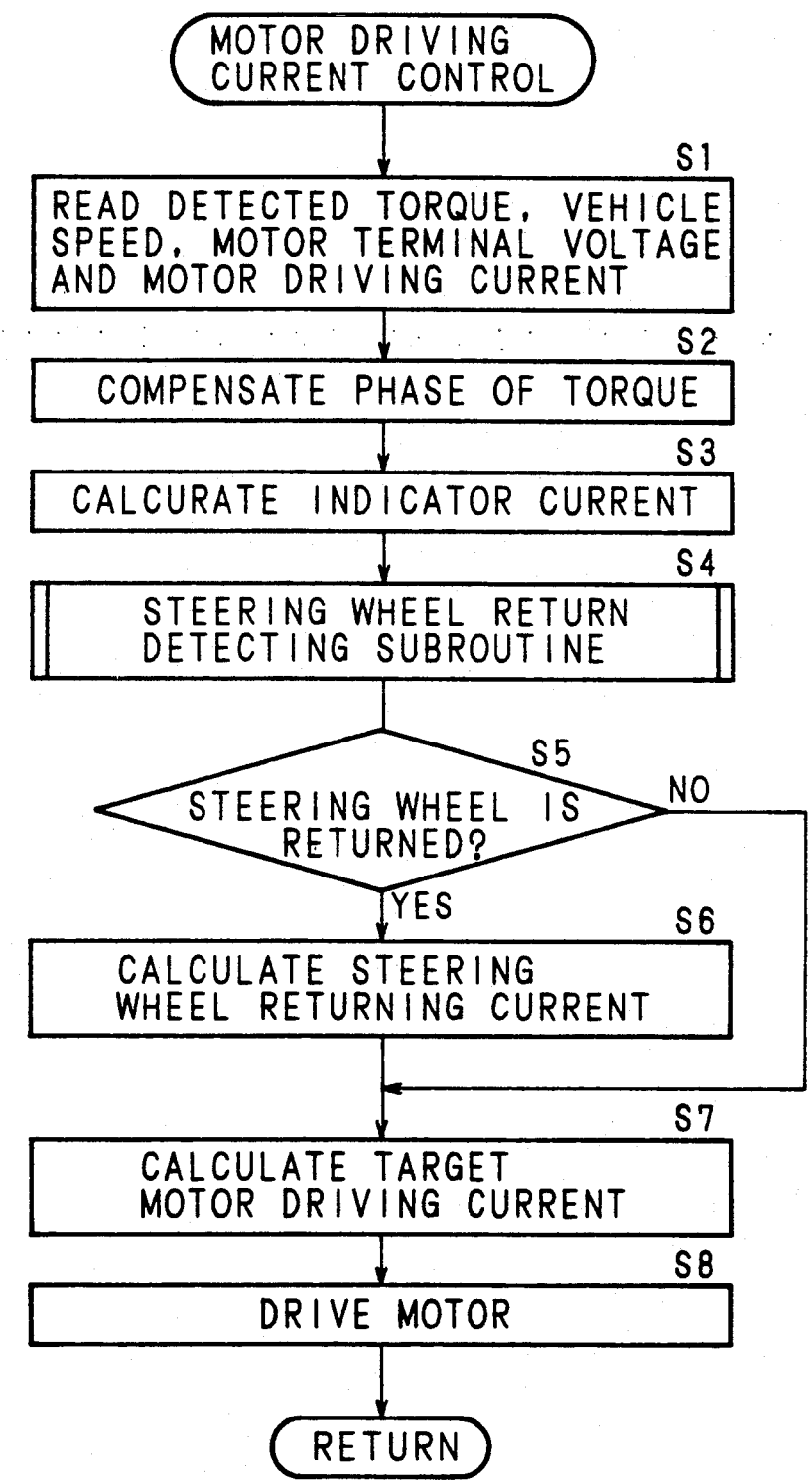
FIG. 7 is a flowchart showing the controlling process of the driving current of the motor according to the first embodiment.

The process of controlling the current for the motor 8 by the control unit 7 as described above will be further explained with reference to a flowchart of FIG. 7.

The control unit 7 reads the torque T, vehicle speed V, terminal voltage $V_M$ and the driving current respectively from the torque sensor 6, speed sensor 18, terminal voltage detecting circuit 71b and current detecting circuit 71c (S1).

The phase compensator 71a compensates the phase of the torque T(S2). The indicator current function unit 73 determines the indicator current I on the basis of the vehicle speed V and phase-compensated torque T using the functions described earlier (S3).

Figure 8:
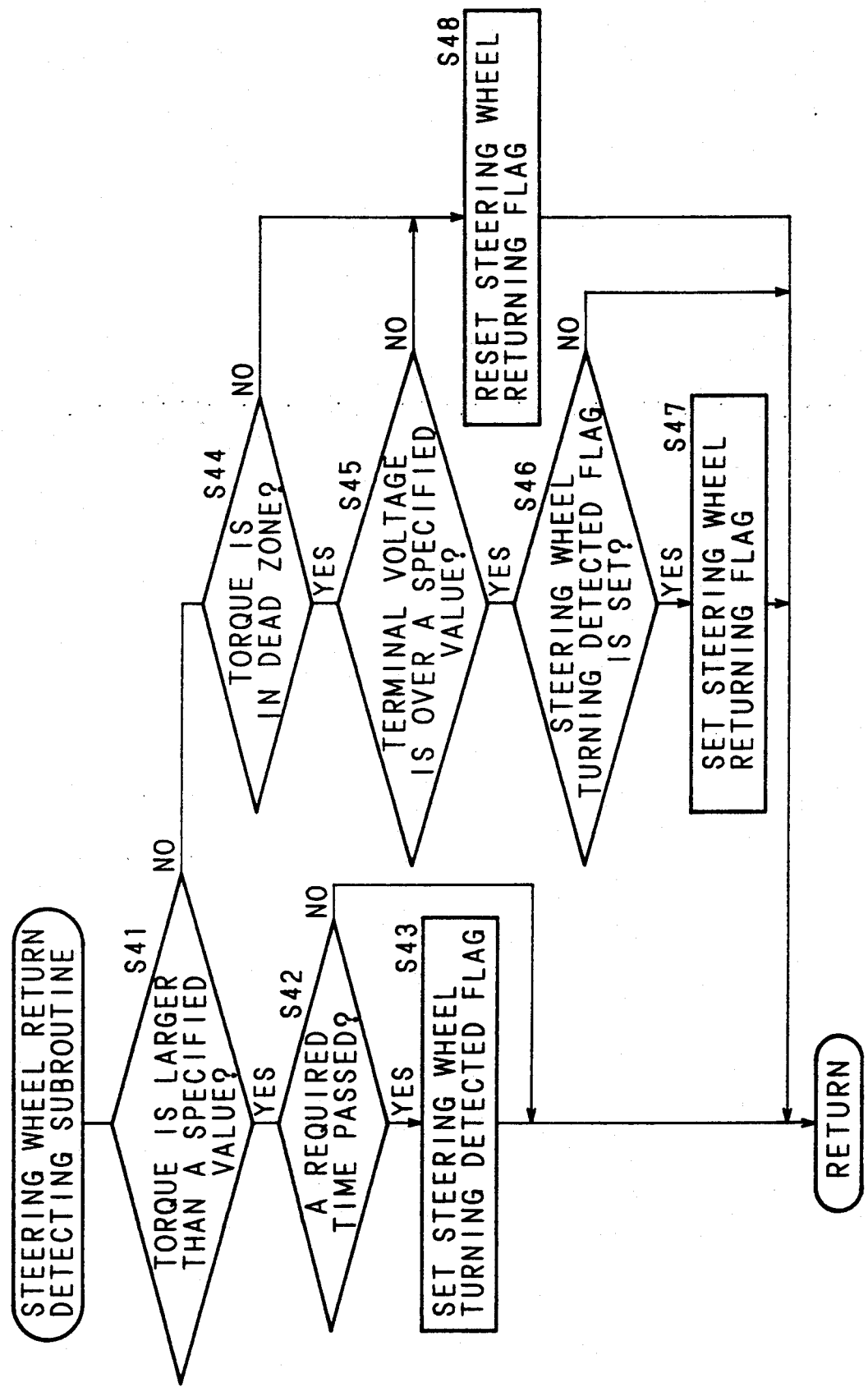
FIG. 8 is a flowchart of a subroutine showing the process of detecting the return of the steering wheel according to the first embodiment.

Then, the flow proceeds to the steering wheel return detecting subroutine (S4). FIG. 8 is a flowchart of the subroutine.

In the steering wheel return detecting subroutine, whether the torque T is larger than a specified value is judged (S41). This specified value is the least value of the steering torque necessary to turn the steering wheel. When it is judged in S41 that the torque T is larger than the specified value, then whether a required time passed is judged (S42). After the required time elapsed, a detected flag indicating the detection that the steering wheel is turned is set, then the flow returns to the main routine (S43).

On the other hand, when the torque T is judged to be equal to or smaller than the specified value in S41, it is judged whether the torque T is within the dead zone from $-D$ to D of the indicator current function unit 73 (S44). When the torque T is outside the dead zone, a returning flag indicating that the steering wheel is being returned is reset, then the flow returns to the main routine (S48).

When the torque T is within the dead zone, it is judged whether the inputted terminal voltage $V_M$ is over a specified value (S45). When the terminal voltage $V_M$ is smaller than the specified value, the returning flag is reset, then the flow returns to the main routine (S48). In this case, the terminal voltage $V_M$ is a counter electromotive force for the motor 8.

In the case where the terminal voltage $V_M$ is not smaller than the specified value, it is judged whether the detected flag is set (S46). When the detected flag is not set, the flow returns to the main routine, whereas, when the detected flag is set, indicating that the steering wheel is being returned, and the returning flag is set, then the flow returns to the main routine (S47). When it is judged that the steering wheel is being returned, the steering wheel return detecting unit 71d outputs a signal indicating the returning direction of the steering wheel to the returning current calculating unit 71e.

After returning from the subroutine, having judged whether the steering wheel is being returned (S5) (i.e., the returning flag is set), the returning current calculating unit 71e calculates the returning current $I_R$ on the basis of the vehicle speed V (S6). The polarity of the returning current $I_R$ is determined based on the signal indicating the returning direction of the steering wheel inputted from the steering wheel return detecting unit 71d, which is the polarity with which the motor 8 rotates the steering wheel in the returning direction detected by the steering wheel return detecting unit 71d.

Meanwhile, when the steering wheel is not being returned (the returning flag is not set), the returning current $I_R$ is not calculated, and therefore the returning current calculating unit 71e outputs 0.

The adder 74a adds the indicator current I to the returning current $I_R$ to obtain the target current for driving the motor 8 (S7). In the case of returning the steering wheel, since the torque T is within the dead zone from $-D$ to D and the indicator current I is 0, the target current is the returning current $I_R$. On the contrary, except when the steering wheel is not being returned, since the torque T is outside the dead zone from $-D$ to D and the returning current $I_R$ is 0, the target current is the indicator current I. The target current thus obtained is inputted to the subtracter 74b. The PWM driving circuit 72 drives the motor 8 by controlling the driving current to be coincident with the target current (S8).

When the steering wheel is detected to be being returned, the returning current $I_R$ is applied to the motor 8, thereby assisting steering force of the steering wheel in the returning direction. In this case, the driving current of the motor 8 is controlled irrespective of the steering angle of the steering wheel.

Figure 9:
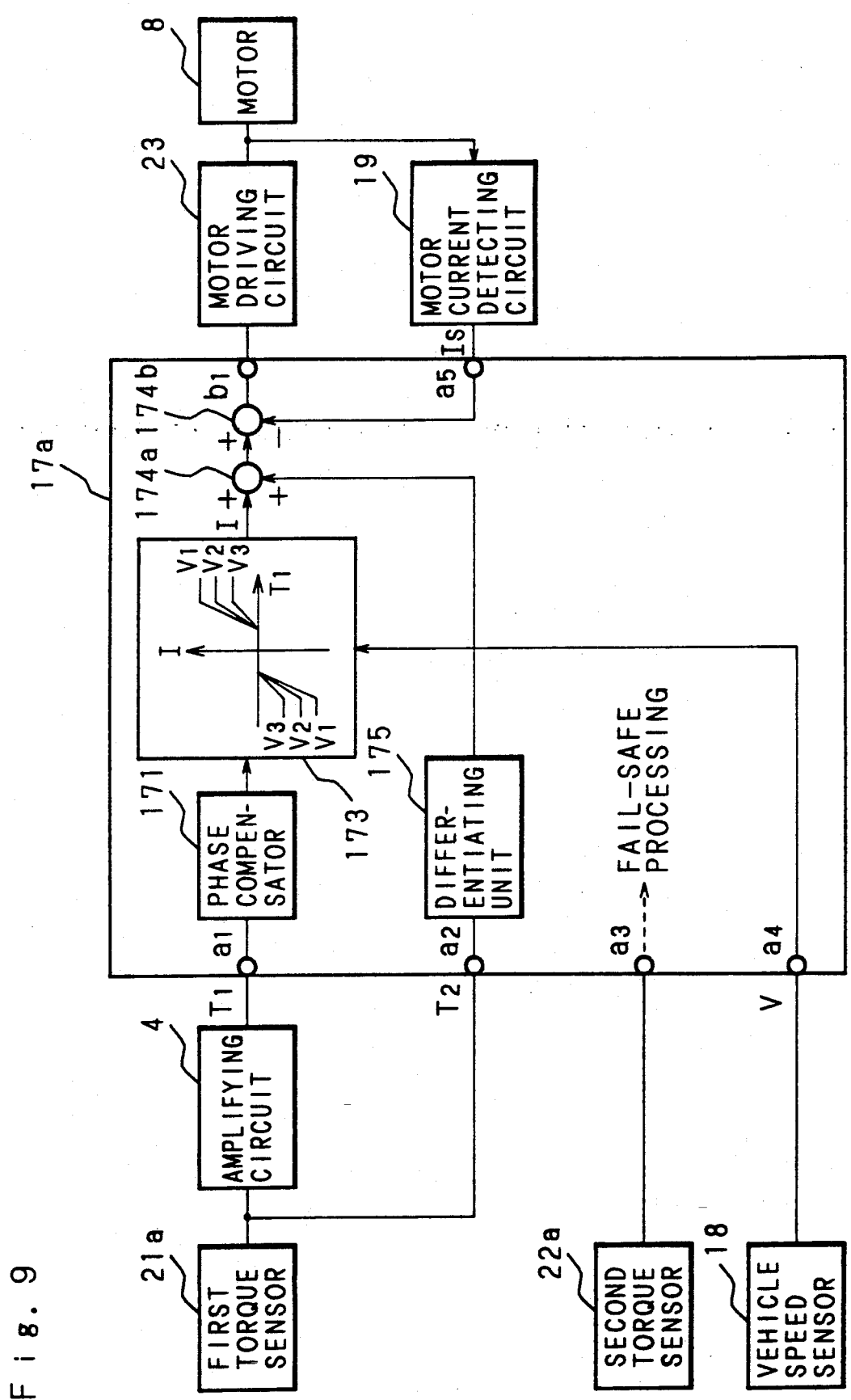
FIG. 9 is a block diagram showing the structure of a second embodiment of a control system of the power steering apparatus of the present invention.

FIG. 9 is a block diagram showing the structure of another embodiment of a control system of the power steering apparatus of the invention, where a numeral and character 17a designates a control unit. A detected signal of a first torque sensor 21a which detects the rotating force exerted onto the steering wheel, interlockingly coupled via a shaft to a steering mechanism (not shown), is inputted to an input port $a_1$ of the control unit 17a as a first detected signal $T_1$ of the steering torque through an amplifying circuit 4 which sets the gain and the upper and lower limits of the signal. A detected signal of the first torque sensor 21a is inputted to an input port $a_2$, without passing through the amplifying circuit 4, as a second detected signal $T_2$. Furthermore, a detected signal of a second torque sensor 22a which, similar to the first torque sensor 21a, detects the rotating force applied to the steering wheel, interlockingly coupled via a shaft to the steering mechanism (not shown), is inputted to an input port $a_3$. To an input port $a_4$ is inputted an output signal from the vehicle speed sensor 18. A current detected signal Is which is an output from a motor current detecting circuit 19 for detecting a driving current for a motor 8 is inputted to an input port $a_5$.

In the meantime, a motor driving circuit 23 for driving the motor 8 for assisting steering force is connected to an output port $b_1$ of the control unit 17a.

The first detected signal $T_1$ inputted to the input port $a_1$ of the control unit 17a is inputted to a phase compensator 171, so that the phase of the first detected signal $T_1$ is advanced. The compensated first detected signal $T_1$ is inputted to a function generating unit 173 outputting a target current I which is a temporary control value of the motor driving current. In the function generating unit 173, such variable functions are set that increase the target current I in proportion to an increase in amplitude of the first detected signal $T_1$ in accordance with the vehicle speed $V(V_1<V_2<V_3)$ inputted to the input port $a_4$ when the signal $T_1$ is out of a predetermined dead zone and finally saturate the target current when the first detected signal $T_1$ exceeds a predetermined value. These variable functions are set so that the ratio of the target current I to the first detected signal $T_1$ becomes smaller as the vehicle speed $V_1,V_2,V_3$ becomes faster, and at the same time, the saturating value of the target current I becomes smaller. The function generating unit 173 determines the target current I in accordance with the first detected signal T1 from the phase compensator 171, and inputs the same to an adder 174a.

The second detected signal $T_2$ inputted to the input port $a_2$ is differentiated in a differentiating unit 175, the result of which is inputted to the adder 174a. The adder 174a adds the target current I from the function generating unit 173 and the differentiating result from the differentiating unit 175, and outputs the same to a subtracter 174b.

The detected signal of the second torque sensor 22a inputted to the input port $a_3$ is used for the fail-safe process to interlock various kinds of controlling units when the first torque sensor 21a breaks down.

The current detected signal Is inputted to the input port $a_5$ is outputted to the subtracter 174b. The subtracter 174b subtracts the current detected signal Is from the added result of the adder 174a. The subtracted result is outputted to the motor driving circuit 23 via an output port $b_1$.

Figure 10:
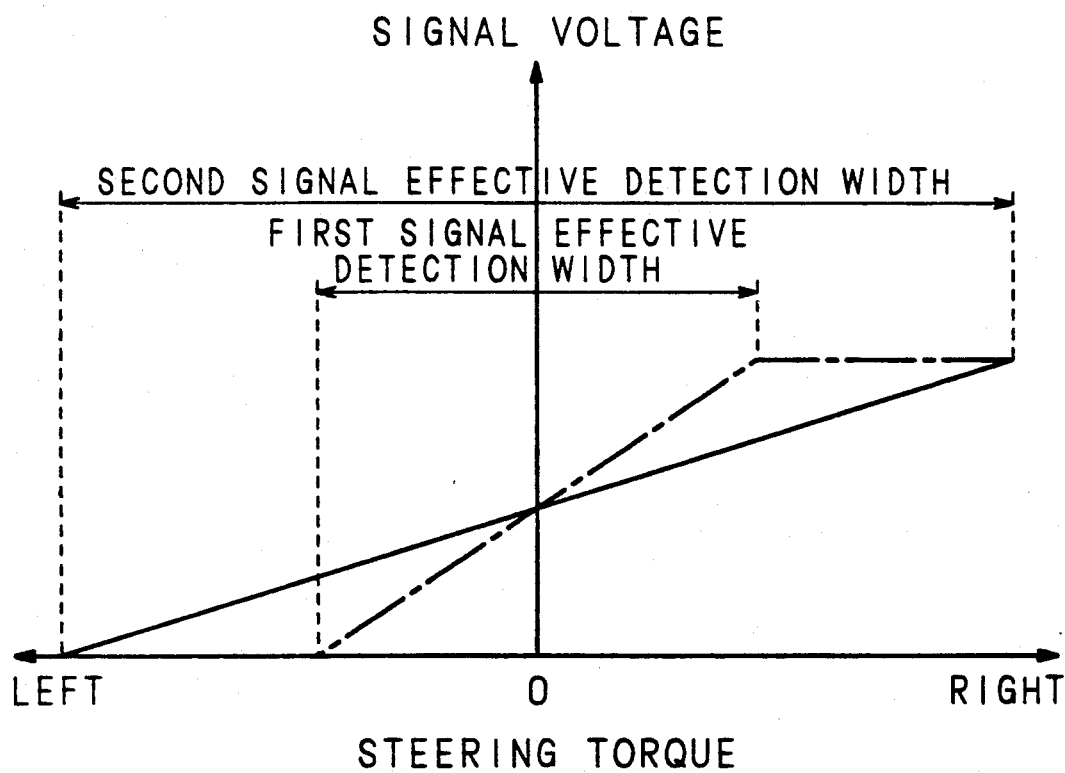
FIG. 10 is a graph showing an example of the relation between the steering torque of a first and a second signals and a voltage of a signal for driving the motor according to the second embodiment.

FIG. 10 shows a graph of the relation between the steering torque and the signal voltage of the first and second detected signals $T_1$ and $T_2$, the vertical axis showing the signal voltage and the horizontal axis showing the steering torque. It is to be noted here that the first detected signal $T_1$ is indicated by a chain line, and the second detected signal $T_2$ is indicated by a solid line in the graph. The voltage of the first detected signal $T_1$ is saturated by the amplifying circuit 4 when the detected steering torque exceeds the necessary range to assist steering force during the normal cruising. This range is the effective detection width of the first detected signal $T_1$.

On the other hand, since the second detected signal $T_2$ is not amplified by the amplifying circuit 4, but is inputted directly from the first torque sensor 21a to the input port $a_2$, the gain is smaller than that of the first detected signal $T_1$. Therefore, the effective detection width of the second detected signal $T_2$ is wider than that of the first detected signal $T_1$, making it possible to obtain the information of the steering torque in the saturating range of the first detected signal $T_1$ from the second detected signal $T_2$. As a result, even the steering torque exceeding the effective detection width of the first detected signal $T_1$ an effective differentiated value can be obtained in the differentiating unit 175 to adjust the target current I.

Figure 11:
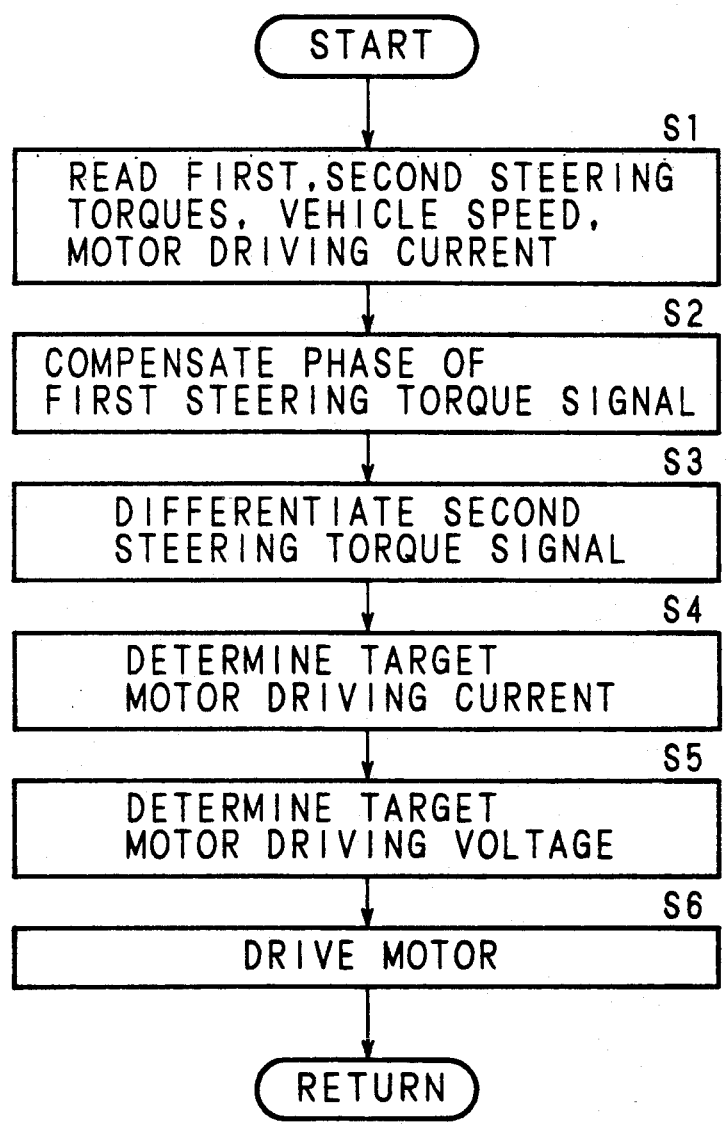
FIG. 11 is a flowchart showing the controlling process of the driving current of the motor according to the second embodiment.

Next, the operation of the control unit 17a constructed in the above-mentioned manner will be discussed with reference to a flowchart of FIG. 11. The control unit 17a reads the first detected signal $T_1$ inputted to the input port $a_1$, second detected signal $T_2$ inputted to the input port $a_2$, detected signal of the vehicle speed V inputted to the input port $a_4$ and current detected signal Is inputted to the input port $a_5$ (S1). The phase compensator 171 compensates the phase of the first detected signal $T_1$ inputted through the input port $a_1$ (S2). The differentiating unit 175 differentiates the second detected signal $T_2$ inputted through the input port $a_2$ (S3). In consequence, the variation rate of the steering torque is obtained.

The function generating unit 173 determines the target current I on the basis of the compensated first detected signal $T_1$ and vehicle speed V inputted to the input port $a_4$ (S4). After the target current I is determined, the adder 174a adds the differentiated result of the differentiating unit 175 to the target current I, thereby determining the final control current for driving the motor 8. The subtracter 174b subtracts the current detected signal Is inputted to the input port a5 from the control current. The subtracted result is controlled through PID control by the motor driving circuit 23, and the control voltage of the motor is determined (S5). The motor driving circuit 23 drives the motor 8 with this control voltage (S6), assisting steering force.

FIG. 12 is a block diagram showing the structure of a further modified embodiment of a control system of the power steering apparatus of the invention. In FIG. 12, the same parts are designated by the same reference numerals as in FIG. 9, the description of which is abbreviated here. According to the control system of the modified embodiment, the gain of the first detected signal $T_1$ which is the detected signal of the first torque sensor 21b is set larger than the gain of the second detected signal $T_2$ which is the detected signal of the second torque sensor 22b by adjusting the detecting circuit of the first or second torque sensors 21b or 22b. A detected signal of the steering torque is directly inputted to the input port $a_1$ of a control unit 17b from the first torque sensor 21b without passing through an amplifying circuit. Moreover, a detected signal from the second torque sensor 22b which is a sensor to detect the steering torque for the fail-safe purpose mentioned earlier is directly inputted to the input port $a_2$, which is in turn divided into a signal to be differentiated by the differentiating unit 175 and a signal subjected to the fail-safe process.

Since the gain of the second detected signal $T_2$ differentiated by the differentiating unit 175 is smaller than that of the first detected signal $T_1$ for determining the target current I, the effective detection width of the second detected signal is wider, so that it is possible to control the steering torque in wider range by differentiating the detected signal than the first detected signal $T_1$.

As described hereinabove, when the current value based on the differentiated value of the steering torque is added to the target current I, the final control current of the motor changes immediately, and accordingly the driving force of the motor 8 can be transmitted to the steering mechanism without a delay in responding to the rotation of the steering wheel detected by the torque sensor.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within the metes and bounds of the claims, or equivalence of such metes and bounds thereof are therefore intended to be embraced by the claims.

What is claimed is:

1. A power steering apparatus which comprises:
    a detecting means for detecting the speed of a vehicle;
    a torque sensor for detecting a steering torque exerted onto a steering wheel;
    driving current generating means, responsive to the torque sensor, for generating a driving current corresponding to the steering torque detected by said torque sensor;
    a motor for assisting steering force, driven by the driving current;
    wherein the driving current generating means comprises:
        a means for detecting the terminal voltage of said motor;
        a steering wheel return detecting means for detecting whether the steering wheel is being returned to the neutral position on the basis of the detected result of said terminal voltage detecting means and of said torque sensor;
        a returning current calculating means, responsive to the vehicle speed detecting means, for calculating a current to drive said motor to assist the return of the steering wheel on the basis of the detected result of said vehicle speed detecting means when said steering wheel return detecting means detects that the steering wheel is being returned; and
        a means for driving said motor by the driving current calculated by said returning current calculating means when said steering wheel return detecting means detects that the steering wheel is being returned.

2. A power steering apparatus as set forth in claim 1, wherein said steering wheel return detecting means detects that the steering wheel is being returned when the steering torque detected by said torque sensor is in the dead zone of a predetermined range during said steering wheel being turned, and the terminal voltage of said motor is not smaller than a predetermined value.

3. A power steering apparatus as set forth in claim 1, wherein said returning current calculating means calculates such a returning current that the returning force of the motor for the steering wheel increases as the vehicle speed becomes closer to a predetermined value of the low speed.

* * * * *